(12) United States Patent
Shiosaki et al.

(10) Patent No.: US 12,300,412 B2
(45) Date of Patent: May 13, 2025

(54) MAGNETIZING APPARATUS AND MAGNETIZING METHOD

(71) Applicant: YOKOGAWA ELECTRIC CORPORATION, Tokyo (JP)

(72) Inventors: Shoichi Shiosaki, Musashino (JP); Shinya Mito, Musashino (JP); Shoma Takeda, Musashino (JP)

(73) Assignee: Yokogawa Electric Corporation, Tokyo (JP)

(*) Notice: Subject to any disclaimer, the term of this patent is extended or adjusted under 35 U.S.C. 154(b) by 323 days.

(21) Appl. No.: 17/906,006

(22) PCT Filed: Mar. 4, 2021

(86) PCT No.: PCT/JP2021/008544
§ 371 (c)(1),
(2) Date: Sep. 9, 2022

(87) PCT Pub. No.: WO2021/182309
PCT Pub. Date: Sep. 16, 2021

(65) Prior Publication Data
US 2023/0119946 A1    Apr. 20, 2023

(30) Foreign Application Priority Data
Mar. 13, 2020 (JP) .................. 2020-044810

(51) Int. Cl.
*H01F 13/00* (2006.01)
*G01N 27/84* (2006.01)

(52) U.S. Cl.
CPC ........... *H01F 13/003* (2013.01); *G01N 27/84* (2013.01)

(58) Field of Classification Search
CPC ...... H01F 13/003; H01F 7/021; H01F 7/0273; H01F 7/0294; H01F 13/00; G01N 27/84
See application file for complete search history.

(56) References Cited

U.S. PATENT DOCUMENTS

| 5,319,335 A | * | 6/1994 | Huang | H01F 7/0268 335/284 |
| 7,679,480 B2 | * | 3/2010 | Stenerson | H01F 13/003 324/345 |
| 2015/0330946 A1 | | 11/2015 | Davis et al. | |

FOREIGN PATENT DOCUMENTS

| CN | 102360696 A | * | 2/2012 |
| CN | 207408346 U | | 5/2018 |

(Continued)

OTHER PUBLICATIONS

Extended European Search Report (EESR) dated Feb. 16, 2024 for European Patent Application No. 21768102.2.

*Primary Examiner* — Mohamad A Musleh
(74) *Attorney, Agent, or Firm* — RANKIN, HILL & CLARK LLP

(57) ABSTRACT

A magnetizing apparatus (1) includes an openable and closeable annular portion (3) formed by a magnet (2). The annular portion (3) includes a lock mechanism (4) configured to hold the annular portion (3) in a closed state. A magnetizing method includes an attaching step of placing an object inside the annular portion (3) by opening and closing the annular portion (3) and attaching the magnetizing apparatus (1) to the object by holding the annular portion (3) in a closed state with the lock mechanism (4), a moving step of moving the magnetizing apparatus (1) relative to the object in the axial direction of the annular portion (3) while the magnetizing apparatus (1) is attached to the object, and a detaching step, after the moving step, of releasing the lock mechanism (4) to detach the magnetizing apparatus (1) from the object.

11 Claims, 15 Drawing Sheets

(56) References Cited

FOREIGN PATENT DOCUMENTS

| | | | |
|---|---|---|---|
| JP | 59-226858 | A | 12/1984 |
| JP | 63-12110 | A | 1/1988 |
| JP | H0687861 | U | 12/1994 |
| JP | 2009-135411 | A | 6/2009 |
| JP | 2020-79790 | A | 5/2020 |
| JP | 2021-144015 | A | 9/2021 |

\* cited by examiner

MAGNETIZING APPARATUS AND MAGNETIZING METHOD

CROSS-REFERENCE TO RELATED APPLICATION

The present application claims priority to Japanese Patent Application No. 2020-44810 filed on Mar. 13, 2020, the entire contents of which are incorporated herein by reference.

TECHNICAL FIELD

The present disclosure relates to a magnetizing apparatus and a magnetizing method.

BACKGROUND

Technology is known for detecting anomalies in magnetic objects using magnetic flaw detection methods such as a magnetic powder flaw detection method and a magnetic flux leakage flaw detection method. Magnetic flaw detection methods detect anomalies based on the principle that when a magnetized object has an anomaly such as wear or damage, leakage magnetic flux is generated at the anomalous area. In the magnetic powder flaw detection method, magnetic powder is sprinkled on the magnetized object, and the resulting magnetic powder pattern is evaluated. In the magnetic flux leakage flaw detection method, flux leakage is detected by a sensor. For example, see Patent Literature (PTL) 1.

CITATION LIST

Patent Literature

PTL 1: US2015/0330946 A1

SUMMARY

Technical Problem

In order to accurately and quickly detect anomalies in an object by a magnetic flaw detection method, the object is preferably magnetized as uniformly as possible. For this purpose, for example, a magnetization device with an annular magnet may be used. By inserting the object into the annular magnet, the object can be uniformly magnetized in the peripheral direction. In this case, the magnetic flaw detection method may be applied while the object is being magnetized by the magnetizing device, or the magnetic flaw detection method may be applied after the object is magnetized by the magnetizing device and is provided with residual magnetization, that is, after the object is magnetized.

However, some pipes, columns, beams, and various other objects in plants, bridges, and other structures have irregularly shaped portions that expand or branch at both ends. It may not be possible to insert objects with irregularly shaped portions at both ends into an annular magnet. Even if an object does not have irregularly shaped portions at both ends, the object may be elongated, for example, making it difficult to place the annular magnet at locations such as the longitudinal center of the object.

The present disclosure aims to provide a magnetizing apparatus and a magnetizing method that enable accurate and rapid detection of anomalies for objects of various shapes.

Solution to Problem

A magnetizing apparatus according to some embodiments includes a circular or non-circular openable and closeable annular portion formed by a magnet, wherein the annular portion includes a lock mechanism configured to hold the annular portion in a closed state. According to this configuration, even if the object has irregularly shaped portions at both ends, the magnetizing apparatus can be attached to the object by opening and closing the annular portion to place the object inside the annular portion and locking the lock mechanism to hold the annular portion in the closed state. Therefore, the object can be magnetized substantially uniformly in the peripheral direction of the annular portion by the magnet forming the annular portion. As a result, anomalies can be detected accurately and rapidly using magnetic flaw detection methods such as the magnetic powder flaw detection method and magnetic flux leakage flaw detection method. Furthermore, according to this configuration, the magnetizing apparatus can be made available for another object by releasing the lock mechanism and detaching the magnetizing apparatus from the object. The peripheral direction of the annular portion refers to the direction that encircles the central axis of the annular portion when the annular portion is closed.

In an embodiment, the magnetizing apparatus further includes a marker holder configured to hold a marker. According to this configuration, while the magnetizing apparatus is attached to the object and the marker holder is holding the marker, the magnetizing apparatus can be moved in the axial direction of the annular portion relative to the object to magnetize the object and simultaneously apply a marking to the magnetized area. It is therefore easy to apply a marking that enables identification of the magnetized area. The marker is, for example, configured by a pen. The axial direction of the annular portion refers to the direction along the central axis of the annular portion when the annular portion is closed.

In an embodiment, the magnet has different polarities in an axial direction of the annular portion. According to this configuration, the object can be magnetized efficiently.

In an embodiment, the magnet includes a plurality of portions interconnected in a peripheral direction of the annular portion. According to this configuration, the annular portion can easily be configured.

In an embodiment, the annular portion includes a hinge rotatably connecting portions of the magnet that are adjacent in the peripheral direction of the annular portion. According to this configuration, the rotation of the hinge enables a stable opening and closing operation of the annular portion.

In an embodiment, the hinge is a torque hinge with a predetermined rotational resistance. According to this configuration, the rotational resistance of the torque hinge can suppress the momentum, due to the repulsive force of the magnet, of the annular portion upon opening when the lock mechanism is released. This configuration thus enhances safety.

In an embodiment, the lock mechanism is configured by a toggle latch provided at both peripheral ends of the annular portion. According to this configuration, the lock mechanism can be locked by engaging an engaged portion of the toggle latch body, provided at one peripheral end of the annular portion, with an engagement portion of the toggle latch, provided at the other peripheral end of the annular portion, and the lock mechanism can be released by disengaging the toggle latch. The lock mechanism can therefore be locked and unlocked by a simple operation.

In an embodiment, the annular portion includes a sliding plate that forms an inner peripheral surface of the annular portion. According to this configuration, the object can be easily magnetized by sliding the magnetizing apparatus via the sliding plate in the axial direction of the annular portion relative to the object while the magnetizing apparatus is attached to the object. In other words, the sliding plate reduces the sliding resistance between the magnetizing apparatus and the object.

In an embodiment, the marker holder is configured so that the marker is detachable. According to this configuration, the marker can be replaced. The marker can thereby be replaced with a new marker or with a marker of a different thickness, color, or the like.

In an embodiment, the marker holder presses the marker toward the radial inner side of the annular portion. According to this configuration, the marker can be more reliably pressed against the object to apply a marking to the object while the magnetizing apparatus is attached to the object. The radial direction refers to the direction along a line orthogonal to the central axis of the annular portion when the annular portion is closed.

In an embodiment, the marker holder holds the marker rotatably, or movably in the radial direction, toward the radial inner side of the annular portion. According to this configuration, the marker can be more reliably pressed against the object to apply a marking to the object while the magnetizing apparatus is attached to the object.

In an embodiment, the marker holder includes a first holder member supported by the annular portion, a second holder member held by the first holder member slidably along the radial direction of the annular portion, a fixing member that fixes the marker to the second holder member, and a forcing member that forces the second holder member toward the radial inner side of the annular portion. According to this configuration, the marker can be held movably along the radial direction toward the radial inner side of the annular portion by a simple structure.

In an embodiment, the magnet extends over the entire periphery of the annular portion when the annular portion is closed. According to this configuration, the object can be magnetized more uniformly.

In an embodiment, the annular portion is formed by a connecting member that connects the plurality of portions of the magnet to each other. According to this configuration, the annular portion can more easily be configured.

In an embodiment, the connecting member includes the hinge. According to this configuration, the annular portion can more easily be configured.

In an embodiment, the connecting member covers each portion of the magnet. According to this configuration, the magnet can be protected by the connecting member.

In an embodiment, the magnetizing apparatus includes a handle. According to this configuration, the magnetizing apparatus can be easily moved by grasping the handle.

In an embodiment, the handle is provided at two locations on either side of the hinge in the peripheral direction of the annular portion. According to this configuration, the annular portion can be easily opened and closed by grasping the handles.

In an embodiment, the handle is provided on the connecting member. According to this configuration, the handle can easily be configured.

A magnetizing method according to some embodiments is a magnetizing method for magnetizing an object using the magnetizing apparatus, the magnetizing method including an attaching step of attaching the magnetizing apparatus on the object by opening and closing the annular portion to place the object inside the annular portion and holding the annular portion in a closed state with the lock mechanism, a moving step of moving the magnetizing apparatus relative to the object in an axial direction of the annular portion while the magnetizing apparatus is attached to the object, and a detaching step, after the moving step, of releasing the lock mechanism to detach the magnetizing apparatus from the object. According to this configuration, the magnetizing apparatus can be attached to the object by the attaching step even when the object has irregularly shaped portions at both ends. Furthermore, the moving step enables the object to be magnetized uniformly in the peripheral direction of the annular portion. The detaching step enables the magnetizing apparatus to be made available for another object.

In an embodiment, the magnetizing apparatus includes a marker holder, and the magnetizing method further includes a marking step of applying a marking to the object, by performing the moving step, with a marker held by the marker holder. According to this configuration, the marking step enables simultaneous magnetization of the object and application of a marking to the magnetized area. It is therefore easy to apply a marking that enables identification of the magnetized area.

Advantageous Effect

According to the present disclosure, a magnetizing apparatus and a magnetizing method that enable accurate and rapid detection of anomalies for objects of various shapes can be provided.

DETAILED DESCRIPTION

Figure 1:
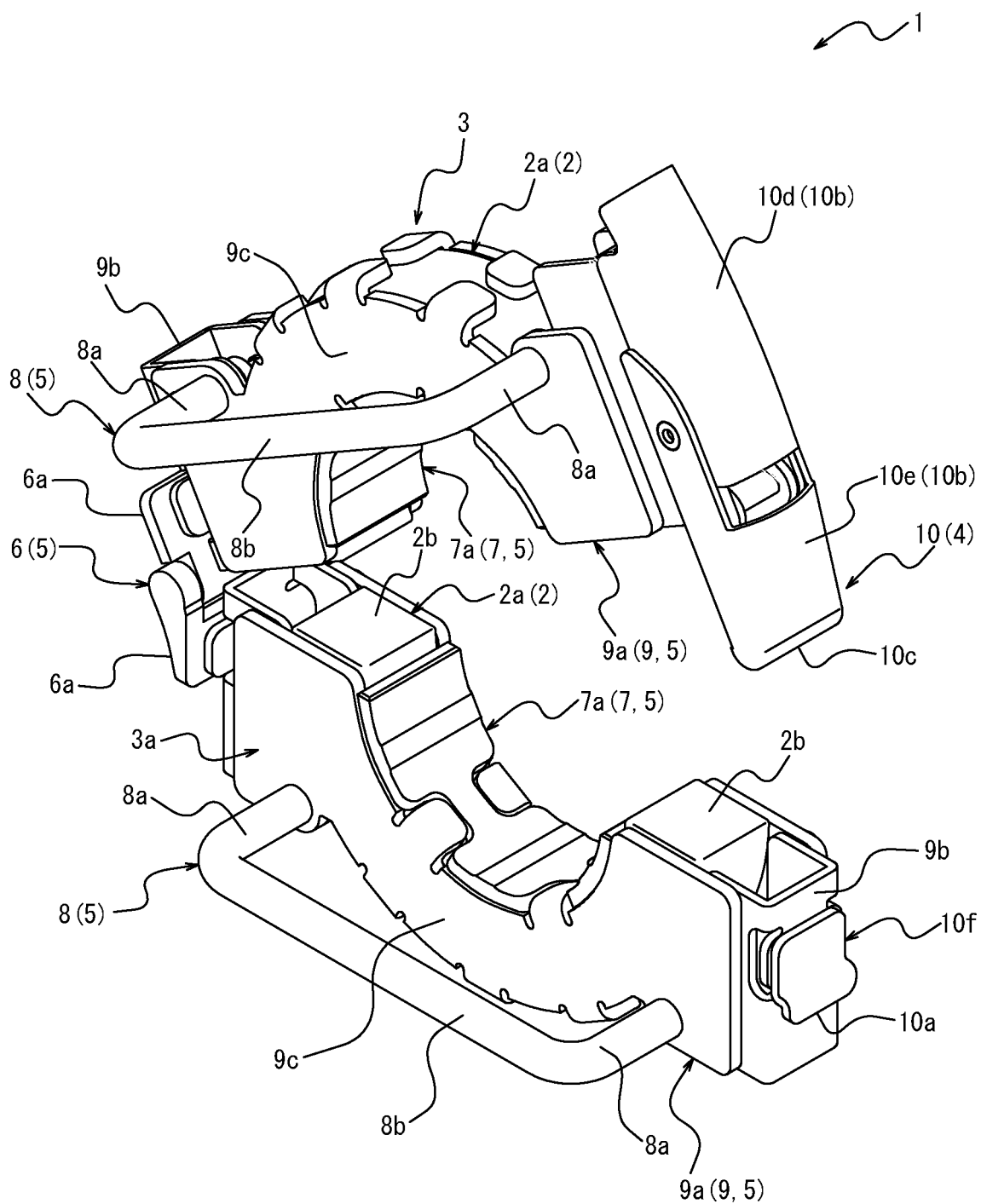
FIG. 1 is a perspective view illustrating a magnetizing apparatus, according to a first embodiment, with an annular portion in an open state.
Figure 2:
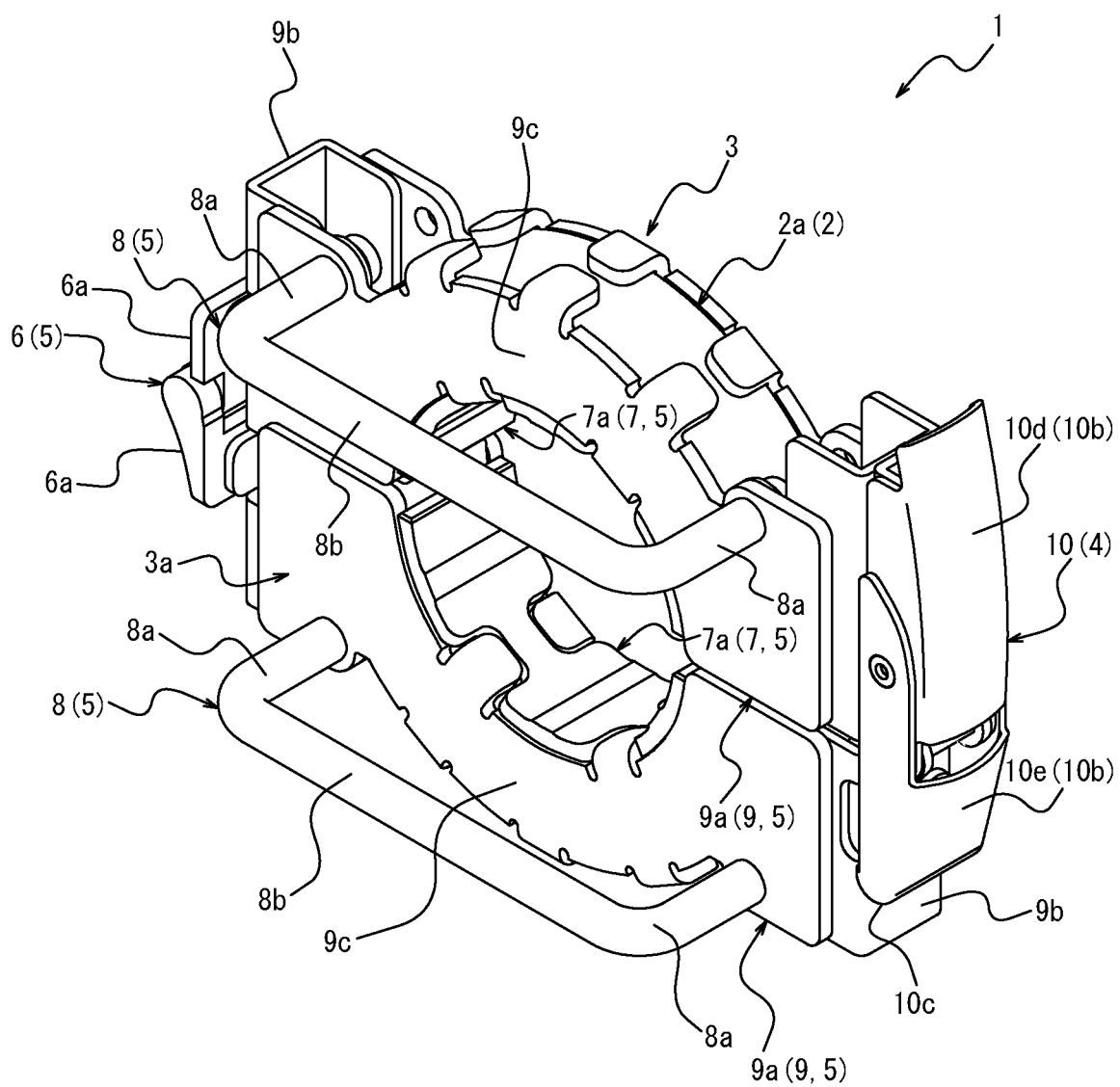
FIG. 2 is a perspective view illustrating the magnetizing apparatus in FIG. 1 with the annular portion in a closed state.
Figure 3:
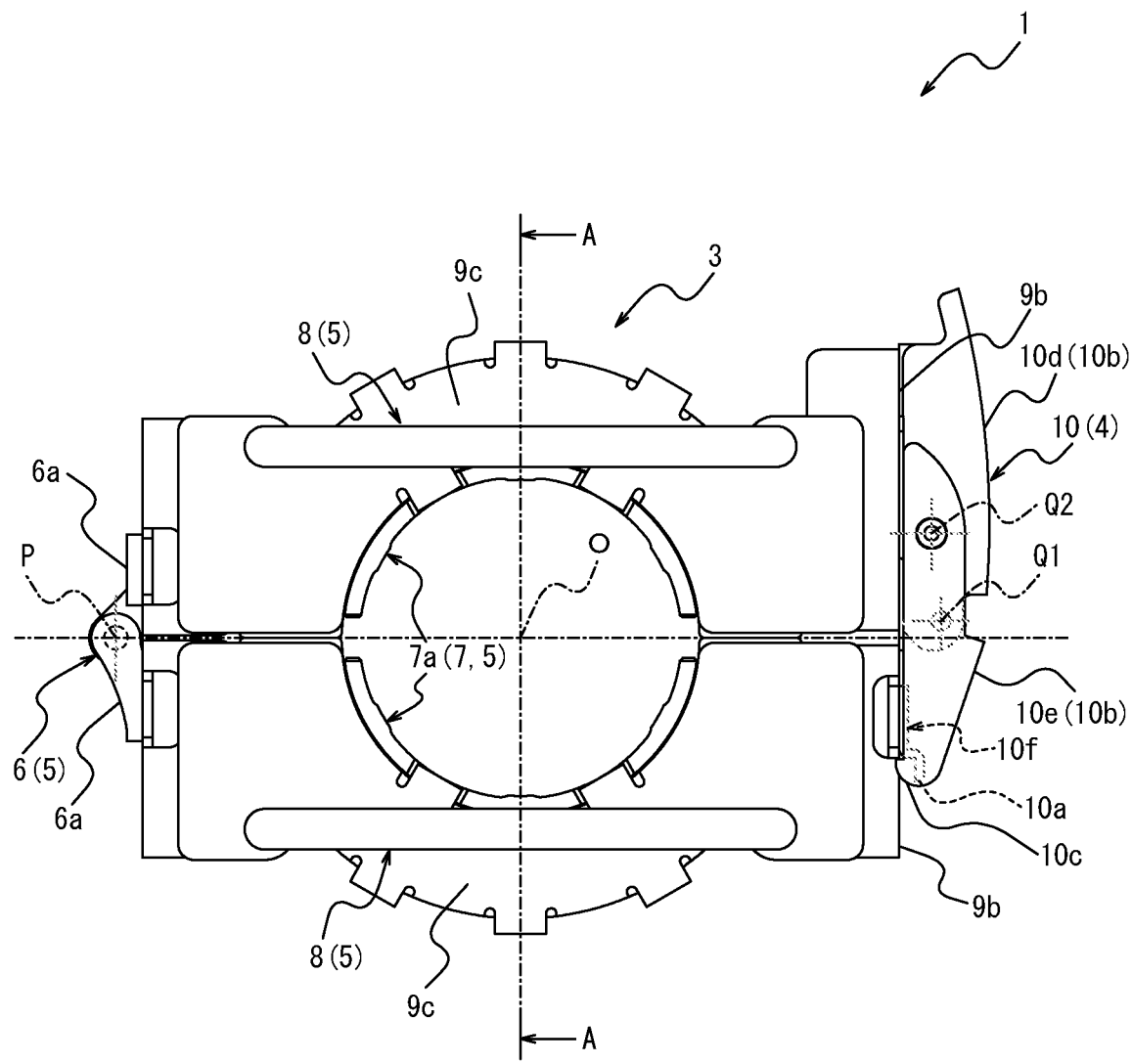
FIG. 3 is a plan view illustrating the magnetizing apparatus in FIG. 1 with the annular portion in a closed state.
Figure 4:
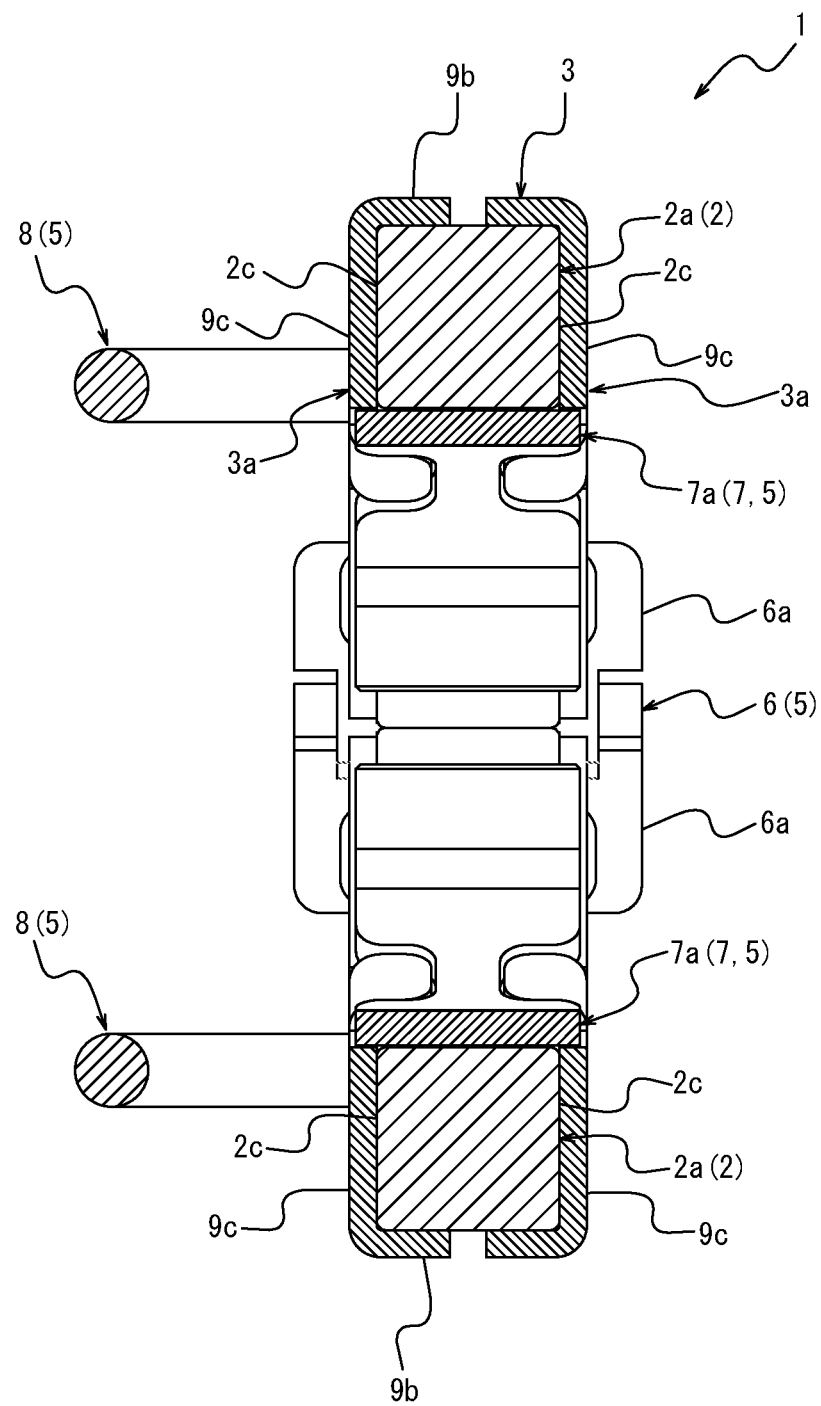
FIG. 4 is a cross-sectional view along the A-A line in FIG. 3.

Embodiments of the present disclosure are described below with reference to the drawings. The same reference sign is appended to corresponding elements across drawings.

A magnetizing apparatus 1 according to a first embodiment of the present disclosure, illustrated in FIGS. 1 to 4, includes a circular, openable and closable annular portion 3 formed by a magnet 2. The annular portion 3 includes a lock mechanism 4 that holds the annular portion 3 in a closed state. The annular portion 3 in the present embodiment is circular to correspond to a cylindrical pipe 11 as the object of magnetization, described below. The annular portion 3 may, however, also have a non-circular shape. For example, the annular portion 3 may have an annular shape forming an H-shape or an I-shape to correspond to H-shaped steel or I-shaped steel as the object of magnetization.

In the present embodiment, the axial direction in the context of the annular portion 3 or the magnet 2 refers to the direction along the central axis O of the annular portion 3 when the annular portion 3 is closed. In the present embodiment, the peripheral direction in the context of the annular portion 3 or the magnet 2 refers to the direction encircling the central axis O of the annular portion 3 when the annular portion 3 is closed. In the present embodiment, the radial direction in the context of the annular portion 3 or the magnet 2 refers to the direction along a line orthogonal to the central axis O of the annular portion 3 when the annular portion 3 is closed.

Figure 5:
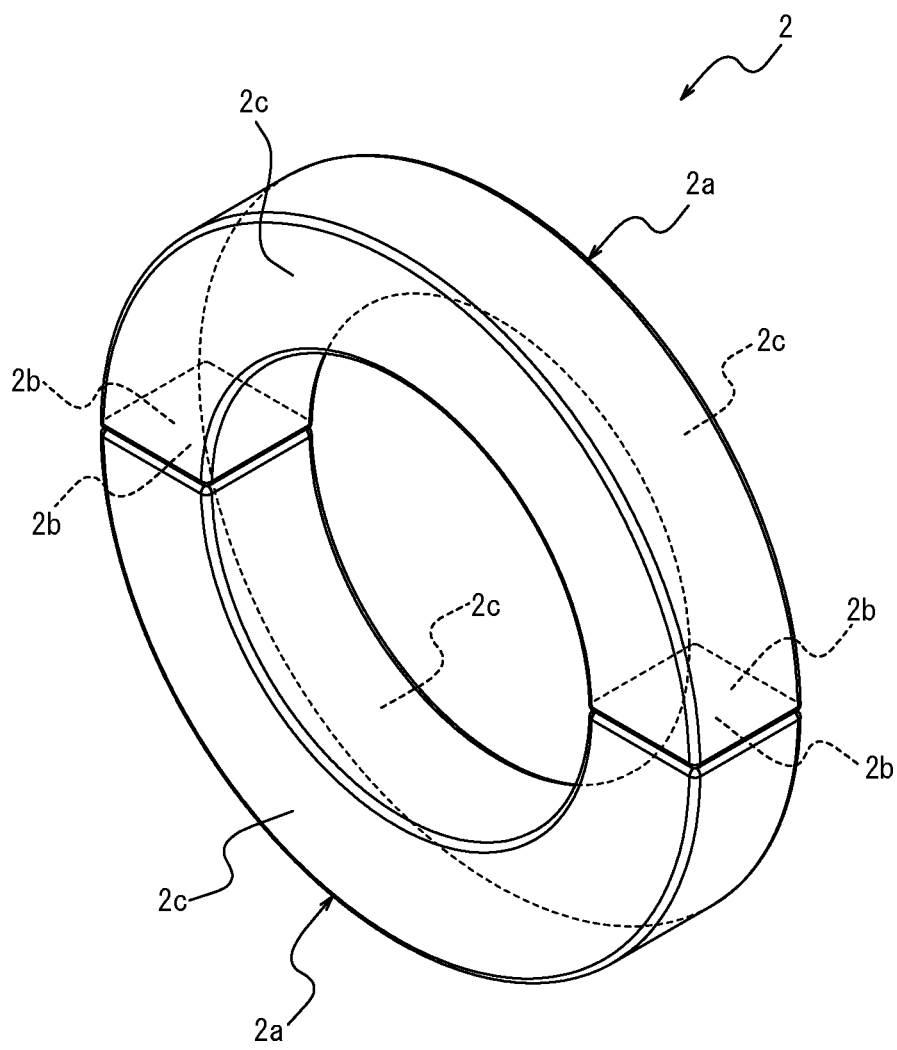
FIG. 5 is a perspective view illustrating a magnet of the magnetizing apparatus in the state illustrated in FIG. 2.

As illustrated in FIG. 5, the magnet 2 is formed by two semi-cylindrical portions 2a. The magnet 2 extends over the entire periphery in the peripheral direction of the annular portion 3 when the annular portion 3 is closed. In other words, when the annular portion 3 is closed, one peripheral end face 2b of one portion 2a of the magnet 2 contacts one peripheral end face 2b of the other portion 2a of the magnet 2, and the other peripheral end face 2b of one portion 2a of the magnet 2 contacts the other peripheral end face 2b of the other portion 2a of the magnet 2.

The magnet 2 has different polarities in the axial direction of the annular portion 3. That is, one axial end face 2c of the magnet 2 is the N pole, and the other axial end face 2c is the S pole. The magnet 2 is a permanent magnet. The magnet 2 is, for example, a neodymium magnet or a ferrite magnet.

As illustrated in FIGS. 1 to 4, the annular portion 3 is formed by a connecting member 5 that interconnects the two portions 2a of the magnet 2. In other words, the annular portion 3 is formed by the magnet 2 and the connecting member 5. The connecting member 5 covers each portion 2a of the magnet 2.

The connecting member 5 includes a hinge 6 that rotatably connects the two portions 2a of the magnet 2. The hinge 6 is a single-axis hinge that rotates around only one rotation axis P parallel to the central axis O of the annular portion 3. The hinge 6 includes an end 6a that is provided integrally with one portion 2a of the magnet 2 and an end 6a that is provided integrally with the other portion 2a of the magnet 2. The hinge 6 is provided at the radial outer end of the annular portion 3. The hinge 6 is a torque hinge having a predetermined rotational resistance.

The connecting member 5 includes a sliding plate 7 that forms the inner peripheral surface of the annular portion 3. The sliding plate 7 is formed by two semi-cylindrical portions 7a. One portion 7a of the sliding plate 7 covers the inner peripheral surface of one portion 2a of the magnet 2, and the other portion 7a covers the inner peripheral surface of the other portion 2a of the magnet 2. Each portion 7a of the sliding plate 7 is formed of a synthetic resin material.

The connecting member 5 includes handles 8 respectively provided at two locations on either side of the hinge 6 in the peripheral direction of the annular portion 3. One handle 8 is provided integrally with one portion 2a of the magnet 2, and the other handle 8 is provided integrally with the other portion 2a of the magnet 2. Both of the two handles 8 are provided at one axial end 3a of the annular portion 3. Each handle 8 is formed by a pair of rod-shaped ends 8a extending parallel to the central axis O of the annular portion 3 and a rod-shaped intermediate portion 8b connecting the pair of ends 8a. The two intermediate portions 8b face each other in the radial direction of the annular portion 3 and extend parallel to each other.

The hinge 6, the sliding plate 7, and the two handles 8 are connected to a cover member 9. In other words, the connecting member 5 is formed by the hinge 6, the sliding plate 7, the two handles 8, and the cover member 9. The cover member 9 is formed by a portion 9a covering one portion 2a of the magnet 2 and a portion 9a covering the other portion 2a of the magnet 2. Each portion 9a of the cover member 9 includes a radial outer end 9b facing the outer peripheral surface of the magnet 2, one axial end 9c facing one axial end face 2c of the magnet 2, and another axial end 9c facing the other axial end face 2c of the magnet 2.

Each portion 9a of the cover member 9 is formed by a plurality of members that are fixed to each other. The plurality of members is formed of a metallic material such as steel. The fixing means for the plurality of members is, for example, fastening means such as screws, or welding.

One end 6a of the hinge 6 is fixed to the radial outer end 9b of one portion 9a of the cover member 9, and the other end 6a of the hinge 6 is fixed to the radial outer end 9b of the other portion 9a of the cover member 9. The fixing means is, for example, fastening means such as screws, or welding. Each end 6a of the hinge 6 is, for example, formed of a metallic material such as steel.

One portion 7a of the sliding plate 7 is fixed to the pair of axial ends 9c of one portion 9a of the cover member 9 by swaging, and the other portion 7a of the sliding plate 7 is fixed to the pair of axial ends 9c of the other portion 9a of the cover member 9 by swaging.

The pair of ends 8a of one handle 8 is fixed to one axial end 9c of one portion 9a of the cover member 9, and the pair of ends 8a of the other handle 8 is fixed to one axial end 9c of the other portion 9a of the cover member 9. The fixing means is, for example, fastening means such as screws, or welding. Each handle 8 is, for example, formed of a metallic material such as steel or a synthetic resin.

The lock mechanism 4 is configured by a toggle latch 10 provided at both peripheral ends of the annular portion 3. The toggle latch 10 is formed by an engagement portion 10a provided at one peripheral end of the annular portion 3 and a toggle latch body 10b provided at the other peripheral end of the annular portion 3. The toggle latch body 10b includes an engaged portion 10c that is engaged with the engagement portion 10a.

The toggle latch body 10b includes an operation lever 10d that releases the engagement between the engagement portion 10a and the engaged portion 10c by rotating towards the radial outer side of the annular portion 3 about a first rotation axis Q1. The operation lever 10d is axially supported by the radial outer end 9b of one portion 9a of the cover member 9 in a rotatable manner about the first rotation axis Q1. The toggle latch body 10b includes an engaged member 10e that is axially supported by the operation lever 10d in a rotatable manner about a second rotation axis Q2 parallel to the first rotation axis Q1. The engaged member 10e includes the engaged portion 10c. The engagement portion 10a of the toggle latch 10 is provided on an engagement member 10f fixed to the radial outer end 9b of the other portion 9a of the cover member 9. The fixing means is, for example, fastening means such as screws, or welding. The operation lever 10d, the engaged member 10e, and the engagement member 10f are, for example, formed of a metallic material such as steel.

Figure 6:
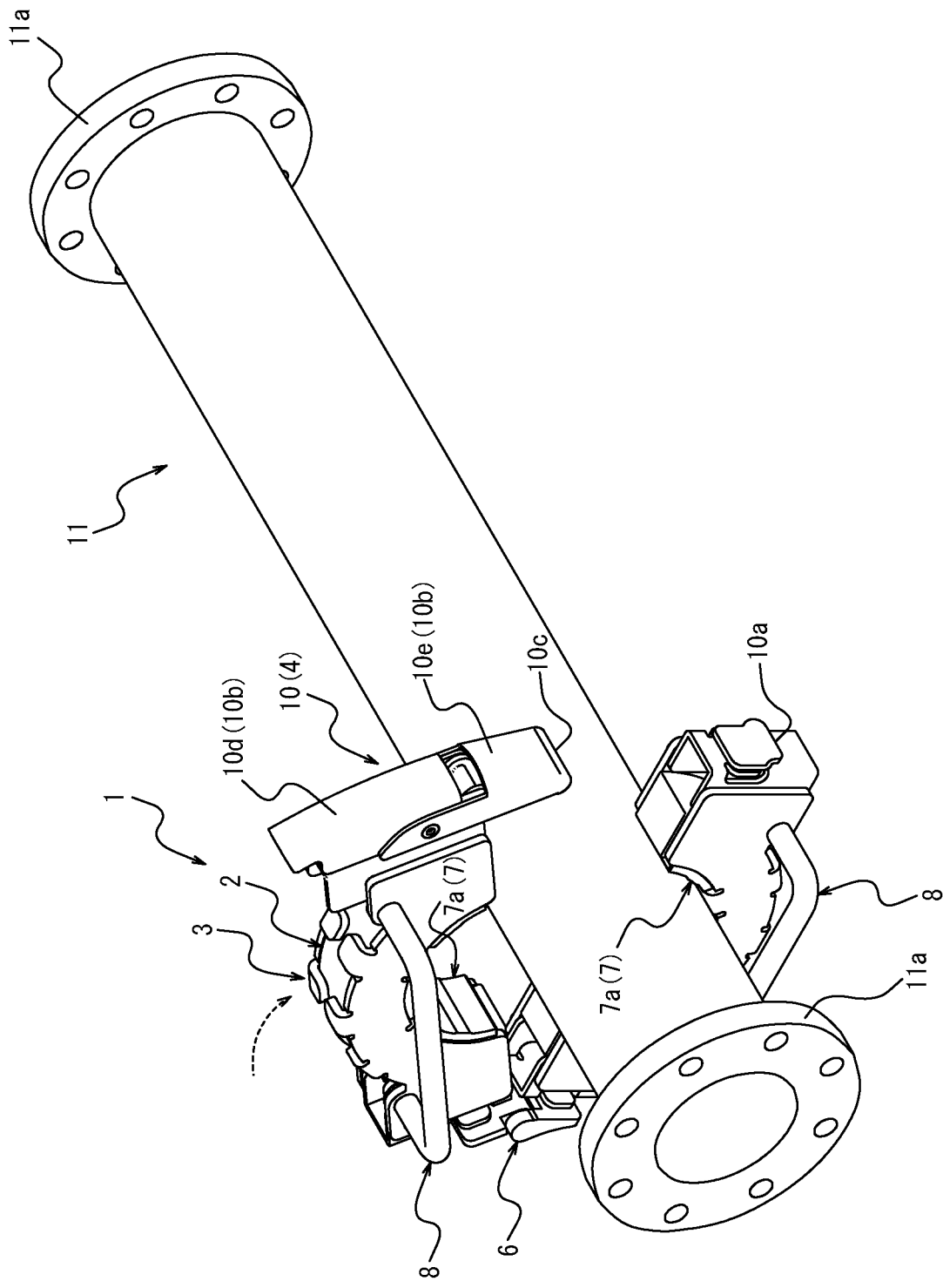
FIG. 6 illustrates a state in which the annular portion of the magnetizing apparatus illustrated in FIG. 1 is opened and clamps a pipe.
Figure 7:
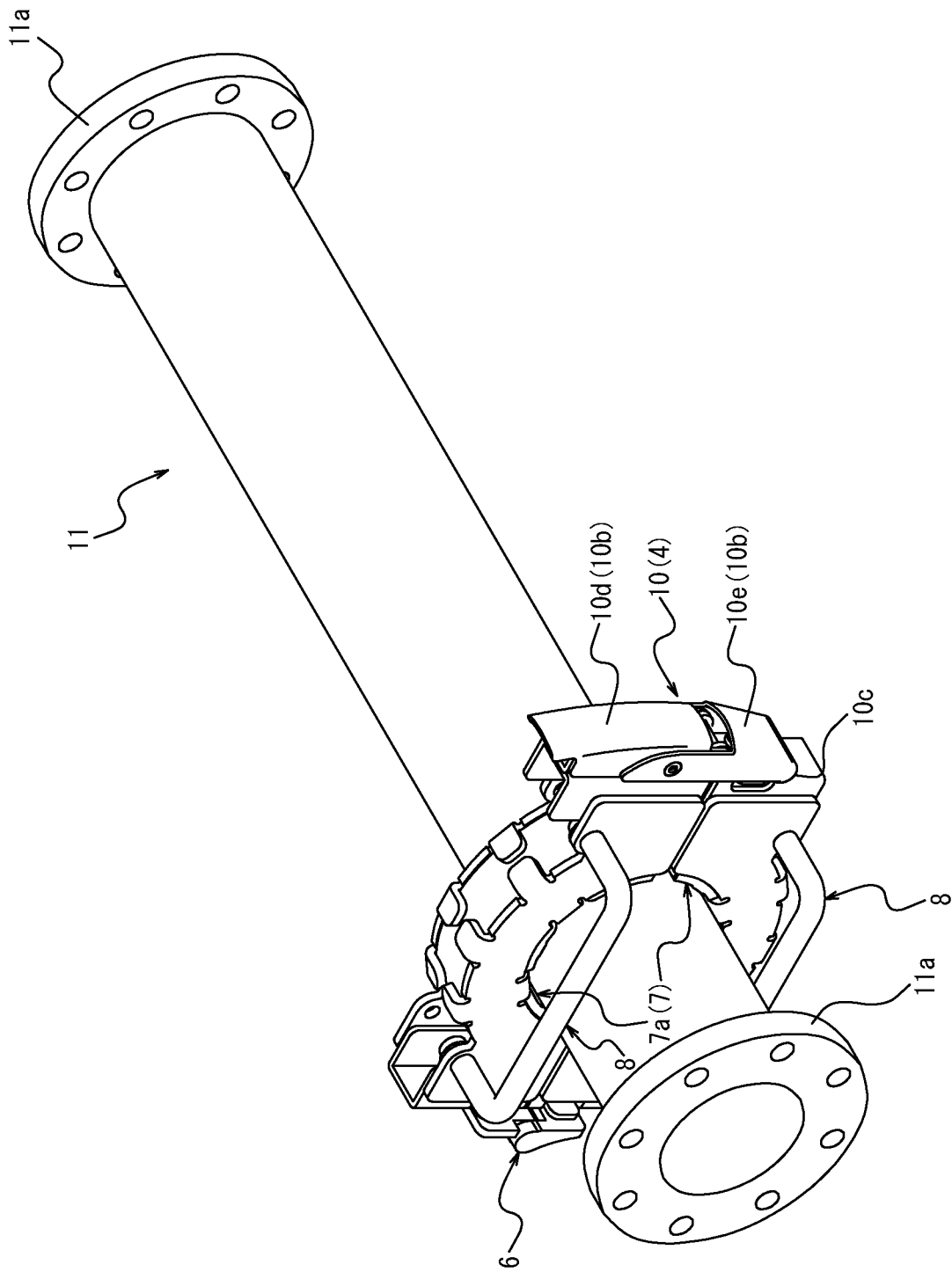
FIG. 7 is a diagram illustrating a state in which the annular portion is closed from the state illustrated in FIG. 6 and a lock mechanism is locked.
Figure 8:
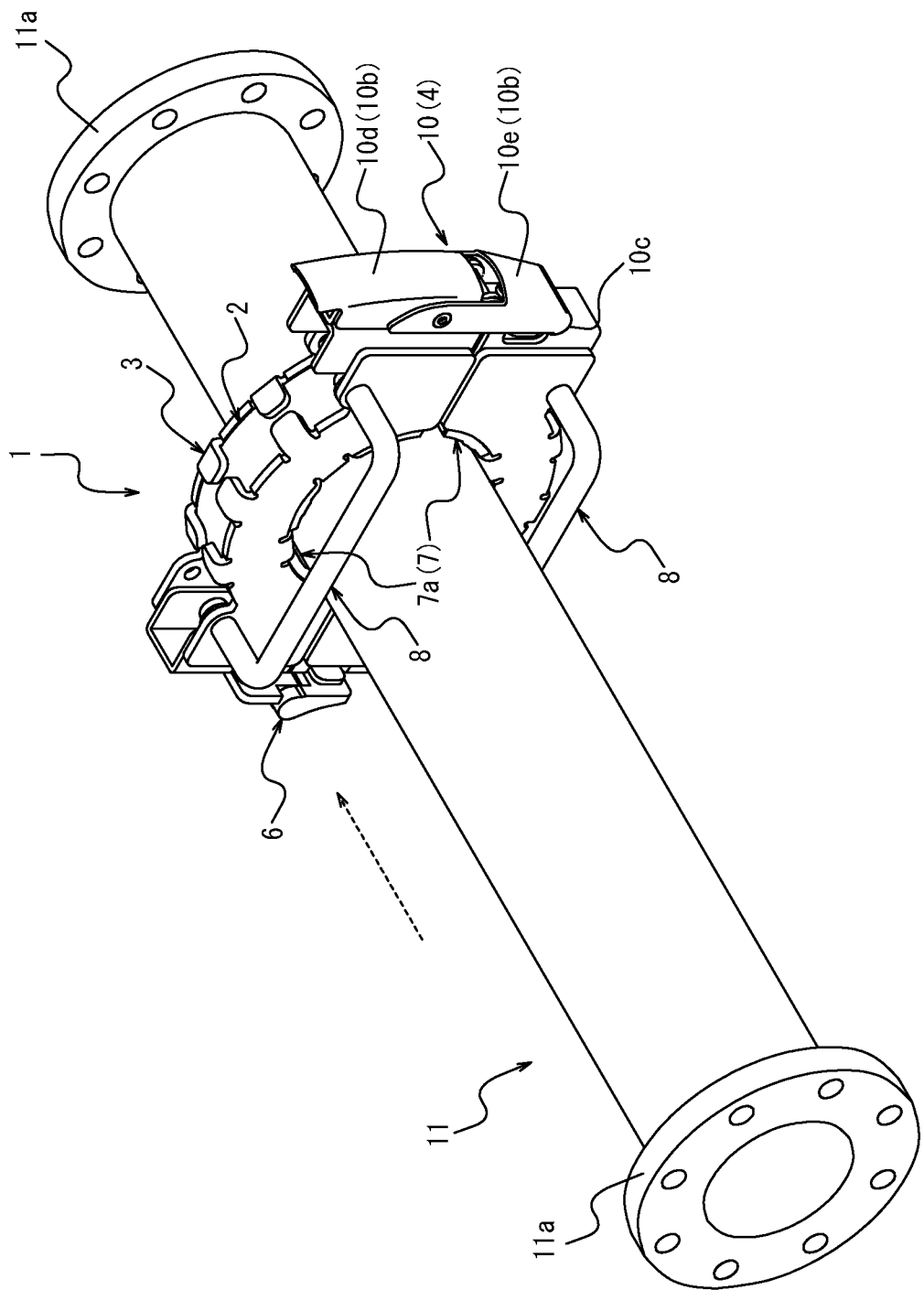
FIG. 8 is a diagram illustrating a state in which the magnetizing apparatus is moved along the pipe from the state illustrated in FIG. 7.

As illustrated in FIGS. 6 to 8, the magnetizing apparatus 1 can, for example, be used to achieve magnetization of the pipe 11 as a magnetic object, such as a ferromagnetic material, and provide the pipe 11 with residual magnetization, i.e., to magnetize the pipe 11. Specifically, a magnetizing method according to the present embodiment to magnetize the pipe 11 using the magnetizing apparatus 1 includes an attaching step, a moving step, and a detaching step. The pipe 11 has flanges 11a as irregularly shaped portions at both ends in the axial direction. In the examples illustrated in FIGS. 6 to 8, the pipe 11 has a circular cross-sectional shape and extends in a straight line in the axial direction. The pipe 11 has an outside diameter of, for example, 2 to 4 inches. The pipe 11 is, for example, installed in a plant, bridge, or other structure.

In the attaching step, the pipe 11 is placed inside the annular portion 3 by opening and closing the annular portion 3 (see FIG. 6), and the magnetizing apparatus 1 is attached to the pipe 11 by holding the annular portion 3 in a closed state with the lock mechanism 4 (see FIG. 7). The attaching step thus enables the magnetizing apparatus 1 to be attached to the pipe 11 that has irregularly shaped portions.

In the attaching step, a worker can easily open and close the annular portion 3 by grasping the two handles 8. At this time, the hinge 6 achieves a stable opening and closing operation of the annular portion 3. The lock mechanism 4 is locked by the engaged portion 10c of the toggle latch body 10b being engaged with the engagement portion 10a of the toggle latch 10.

When the annular portion 3 is attached to the pipe 11, the portion of the pipe 11 located on the radial inner side of the magnet 2 is uniformly magnetized in the peripheral direction by the magnet 2. In particular, since the magnet 2 has different polarities in the axial direction of the annular portion 3, the pipe 11 can be magnetized efficiently.

In the moving step, the magnetizing apparatus 1 is moved relative to the pipe 11 in the axial direction of the annular portion 3 while the magnetizing apparatus 1 is attached to the pipe 11 (see FIG. 8). At this time, the annular portion 3 moves in a straight line in the axial direction of the pipe 11. By performance of this moving step, the pipe 11 is magnetized in the moving range of the annular portion 3. In the moving step, the operator can easily move the annular portion 3 along the pipe 11 by grasping one or both of the two handles 8. In the present embodiment, the annular portion 3 is moved during the moving step toward the side at which the handles 8 are not provided, as illustrated in FIG. 8. However, the attaching step may be performed so that the annular portion 3 can be moved toward the side at which the handles 8 are provided in the moving step. By the annular portion 3 including the sliding plate 7, the sliding resistance between the magnetizing apparatus 1 and the pipe 11 is reduced to enable easy movement of the magnetizing apparatus 1 and also suppress scratching of the pipe 11.

In the detaching step, the magnetizing apparatus 1 is detached from the pipe 11 by releasing the lock mechanism 4 after the moving step (not illustrated). At this time, the worker can easily release the lock mechanism 4 by operating the operation lever 10d of the toggle latch body 10b. When the lock mechanism 4 is released, the annular portion 3 opens due to the repulsive force of the magnet 2. At this time, since the hinge 6 is a torque hinge, the momentum of the opening of the annular portion 3 is suppressed, thereby ensuring safety. The detaching step enables the magnetizing apparatus 1 to be made available for another object.

According to the magnetizing method of the present embodiment, after the detaching step, detection means using a magnetic flaw detection method such as a magnetic powder flaw detection method or a magnetic flux leakage flaw detection method can be applied to the magnetized portion of the pipe 11 to detect abnormalities in the pipe 11 accurately and quickly. For example, by installation of an abnormality detection apparatus 15 (see FIG. 10) with a magnetic sensor on the magnetized portion of the pipe 11, abnormalities can be detected using a magnetic flux leakage flaw detection method.

A second embodiment of the present disclosure is illustrated next with reference to FIGS. 9 and 10.

Figure 9:
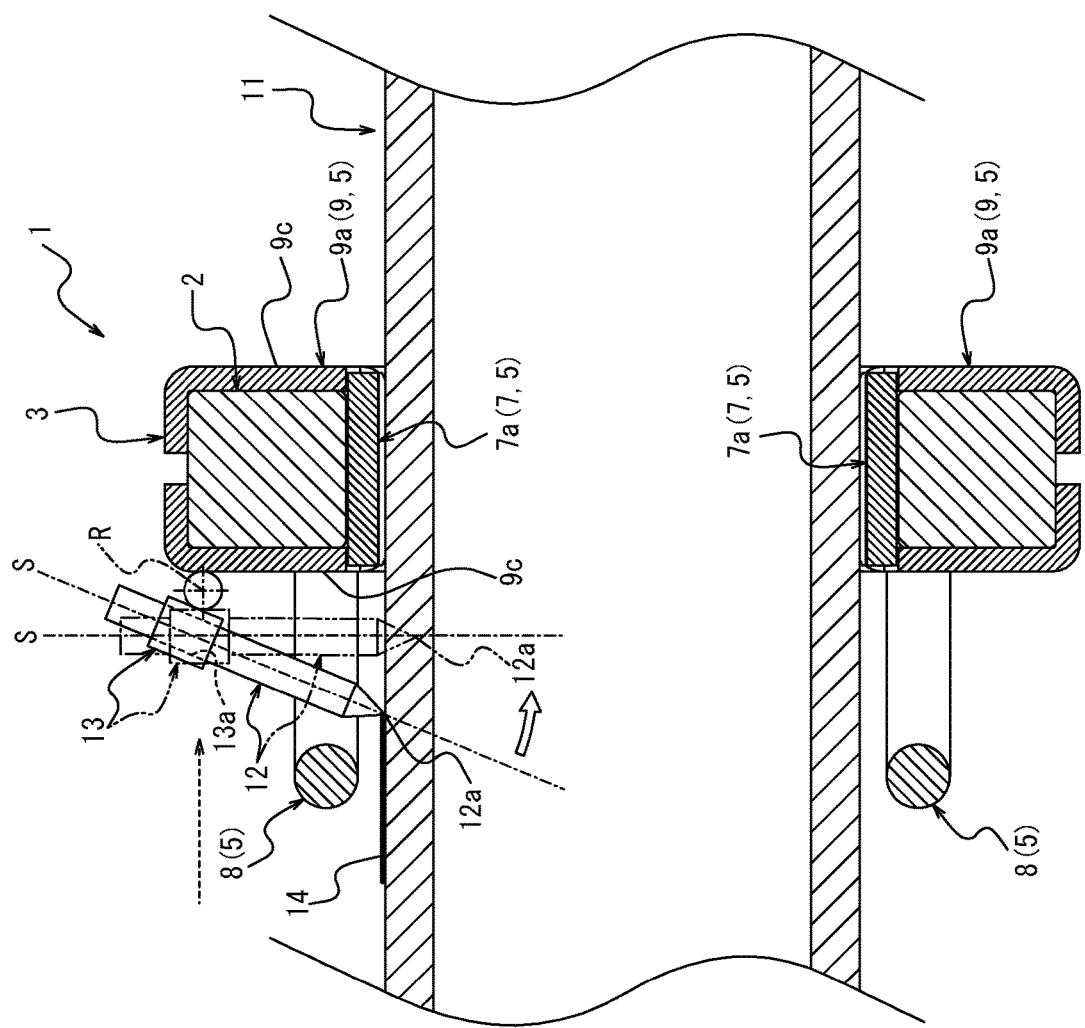
FIG. 9 is a diagram illustrating a state in which a magnetizing apparatus according to a second embodiment is moved along a pipe.
Figure 10:
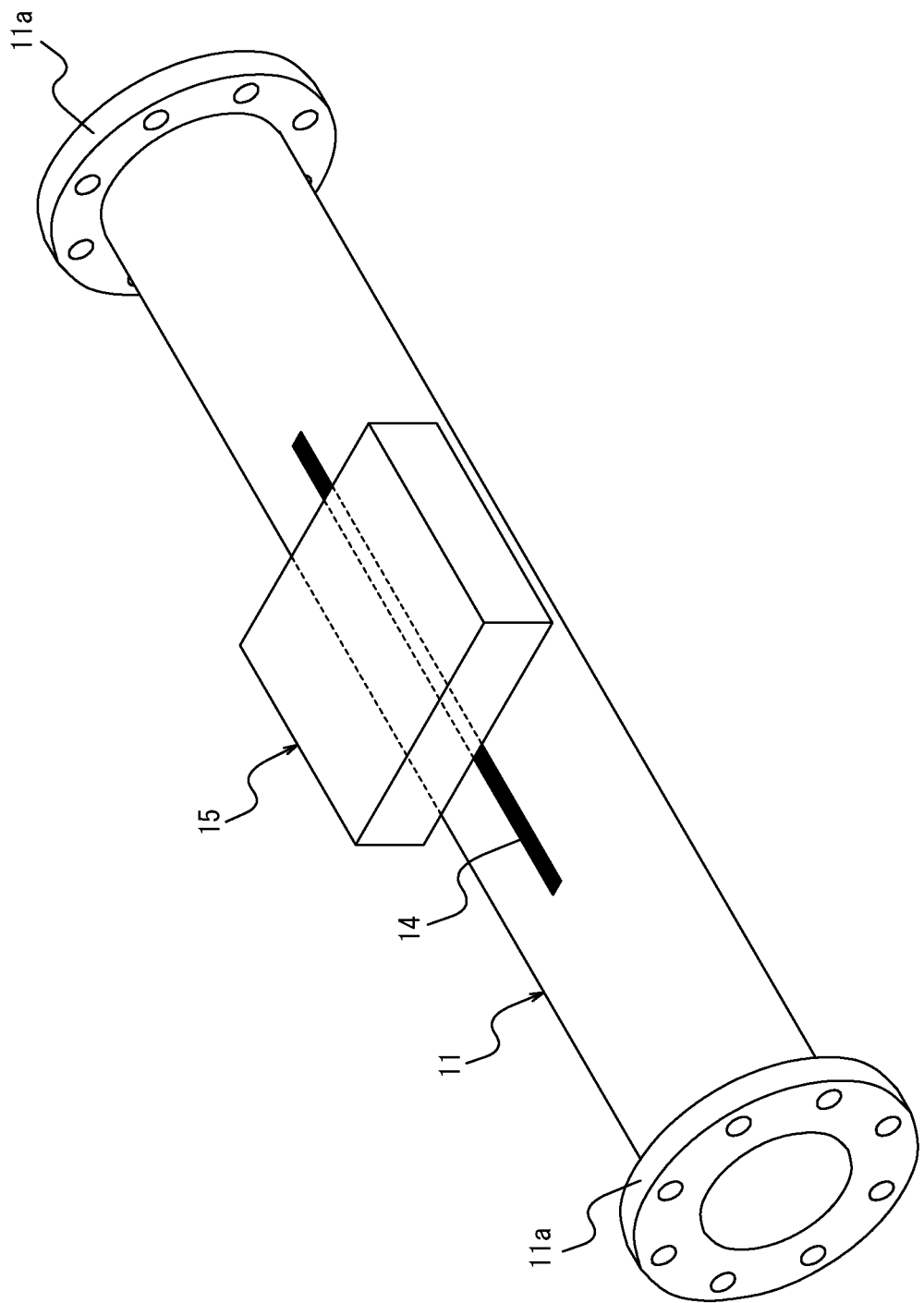
FIG. 10 is a diagram illustrating a state in which a sensor is installed on a pipe magnetized by the magnetizing apparatus illustrated in FIG. 9.

The magnetizing apparatus 1 according to the present embodiment, illustrated in FIG. 9, includes a marker holder 13 that detachably holds a marker 12. The marker holder 13 forces the marker 12 toward the radial inner side of the annular portion 3. In the present embodiment, the marker holder 13 holds the marker 12 rotatably toward the radial inner side of the annular portion 3.

In greater detail, the marker holder 13 is axially supported by one axial end 9c of the cover member 9 in a rotatable manner about a rotation axis R. The rotation axis R extends in a direction perpendicular to both the radial and axial directions of the annular portion 3. The marker 12 is a pen. The marker holder 13 includes an inner peripheral surface 13a that can be attached to and detached from the outer peripheral surface of the marker 12 and is centered on an axis S. The marker 12 is disposed concentrically with the axis S by being held in the marker holder 13. The marker holder 13 is forced from a state in which the axis S is inclined relative to the axial outer side of the annular portion 3 toward the radial inner side of the annular portion 3 (the state illustrated by a solid line in FIG. 9) toward a state in which the axis S extends along the radial direction of the annular portion 3 (the state illustrated by a dashed double dotted line in FIG. 9). The forcing means is, for example, a spring.

According to the magnetizing apparatus 1 of the present embodiment, the pipe 11 can be magnetized by the same method as in the first embodiment. Also, according to the magnetizing apparatus 1 of the present embodiment, by performance of the moving step, a marking 14 can be applied to the pipe 11 by the marker 12 held in the marker holder 13. In other words, as illustrated in FIG. 9, by the magnetizing apparatus 1 being moved along the pipe 11, the marker 12 can be moved along the pipe 11 together with the annular portion 3 while a pen tip 12a of the marker 12 is pressed against the outer peripheral surface of the pipe 11 by the marker holder 13. As a result, a marking 14 corresponding to the magnetized area of the pipe 11 in the axial direction is applied, as illustrated in FIG. 10.

Therefore, the magnetized portion of the pipe 11 can be easily identified during application of detection means using a magnetic flaw detection method such as a magnetic powder flaw detection method or a magnetic flux leakage flaw detection method. For example, as illustrated in FIG. 10, based on the marking 14, the abnormality detection apparatus 15 can accurately be installed at the magnetized portion of the pipe 11, thus enabling accurate detection of anomalies using a magnetic flux leakage flaw detection method.

A third embodiment of the present disclosure is illustrated next with reference to FIGS. 11 to 15.

Figure 11:
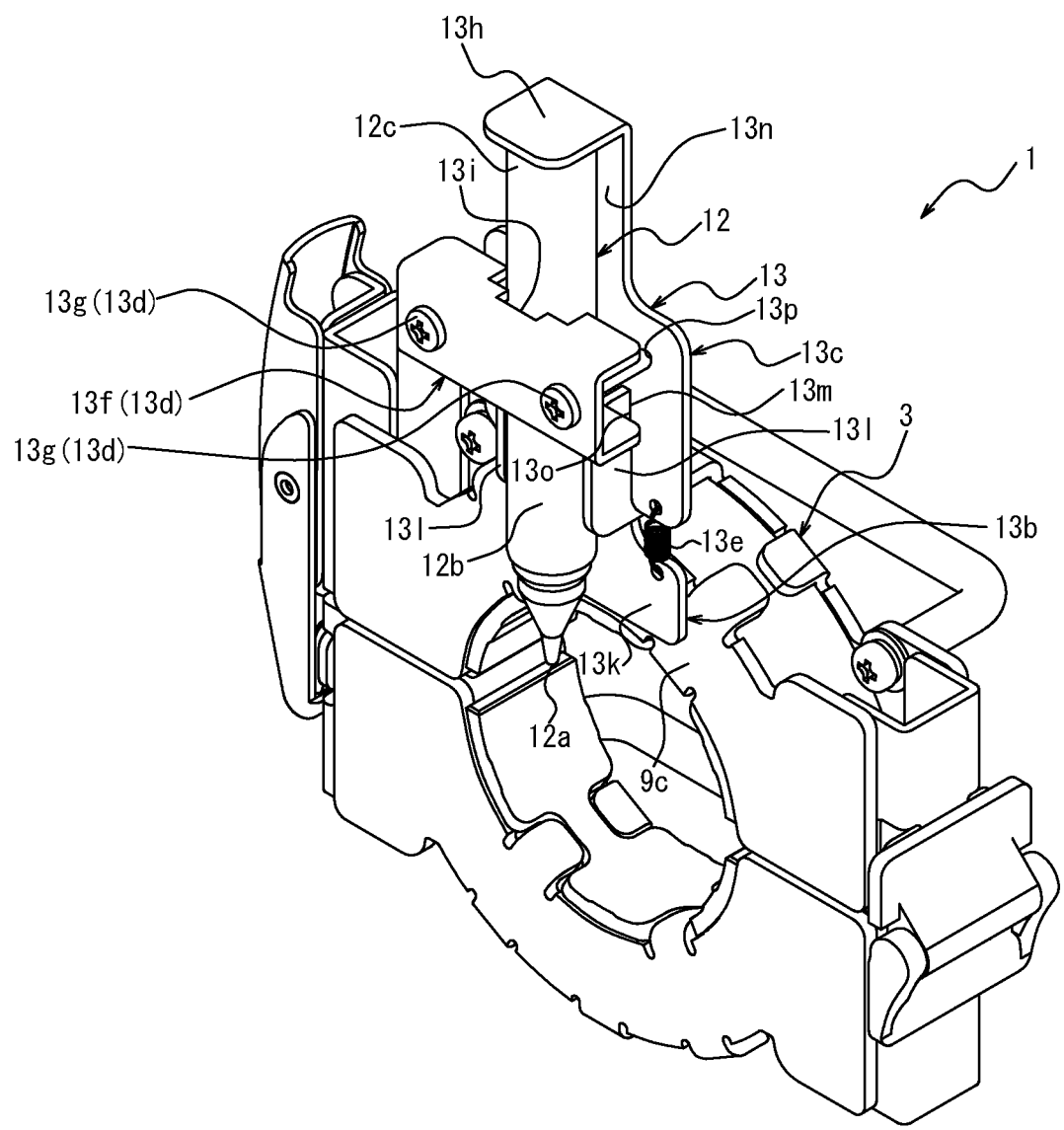
FIG. 11 is a perspective view illustrating a magnetizing apparatus according to a third embodiment.
Figure 13:
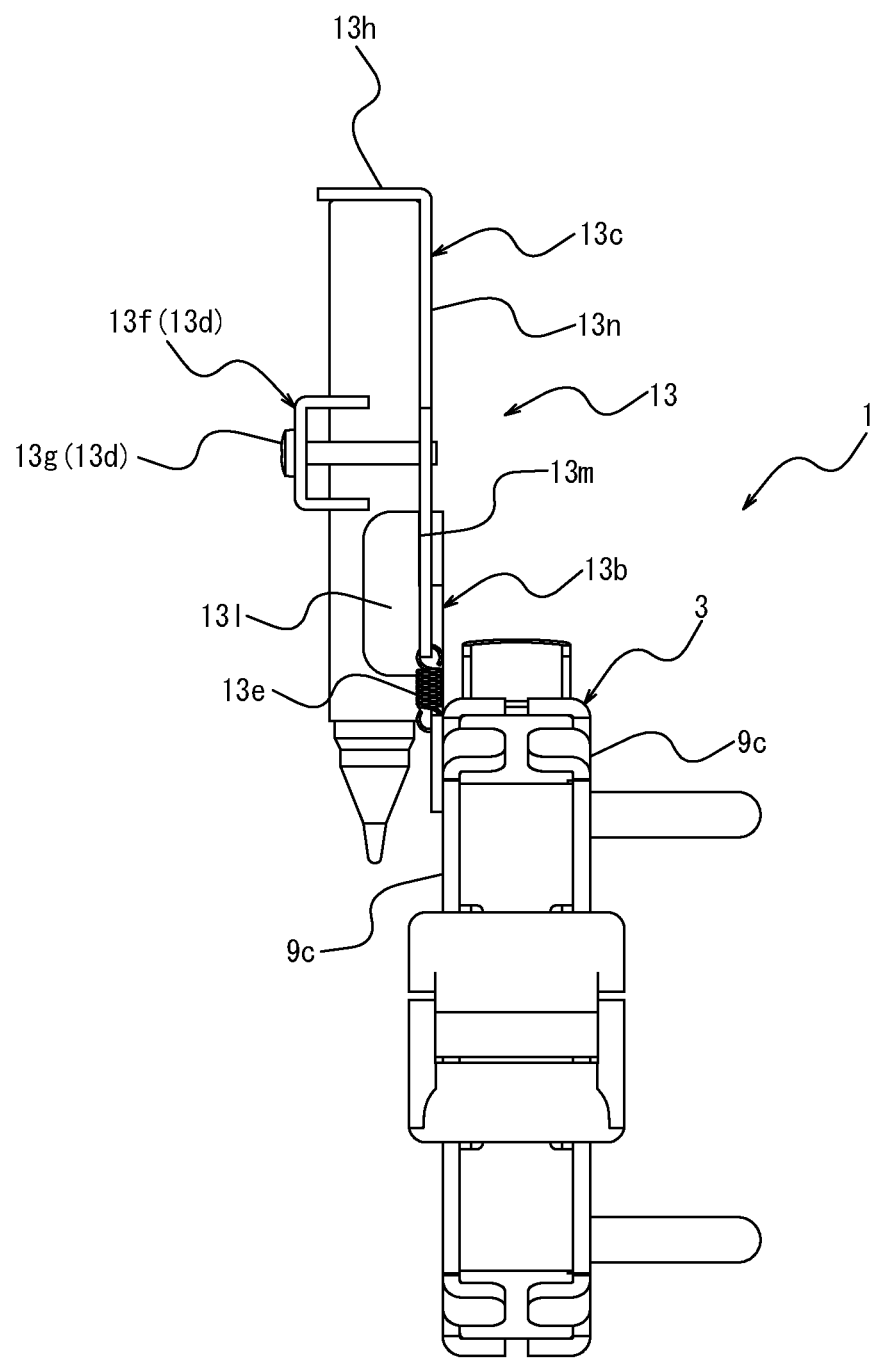
FIG. 13 is a side view of the magnetizing apparatus illustrated in FIG. 11, viewed in the radial direction.
Figure 14:
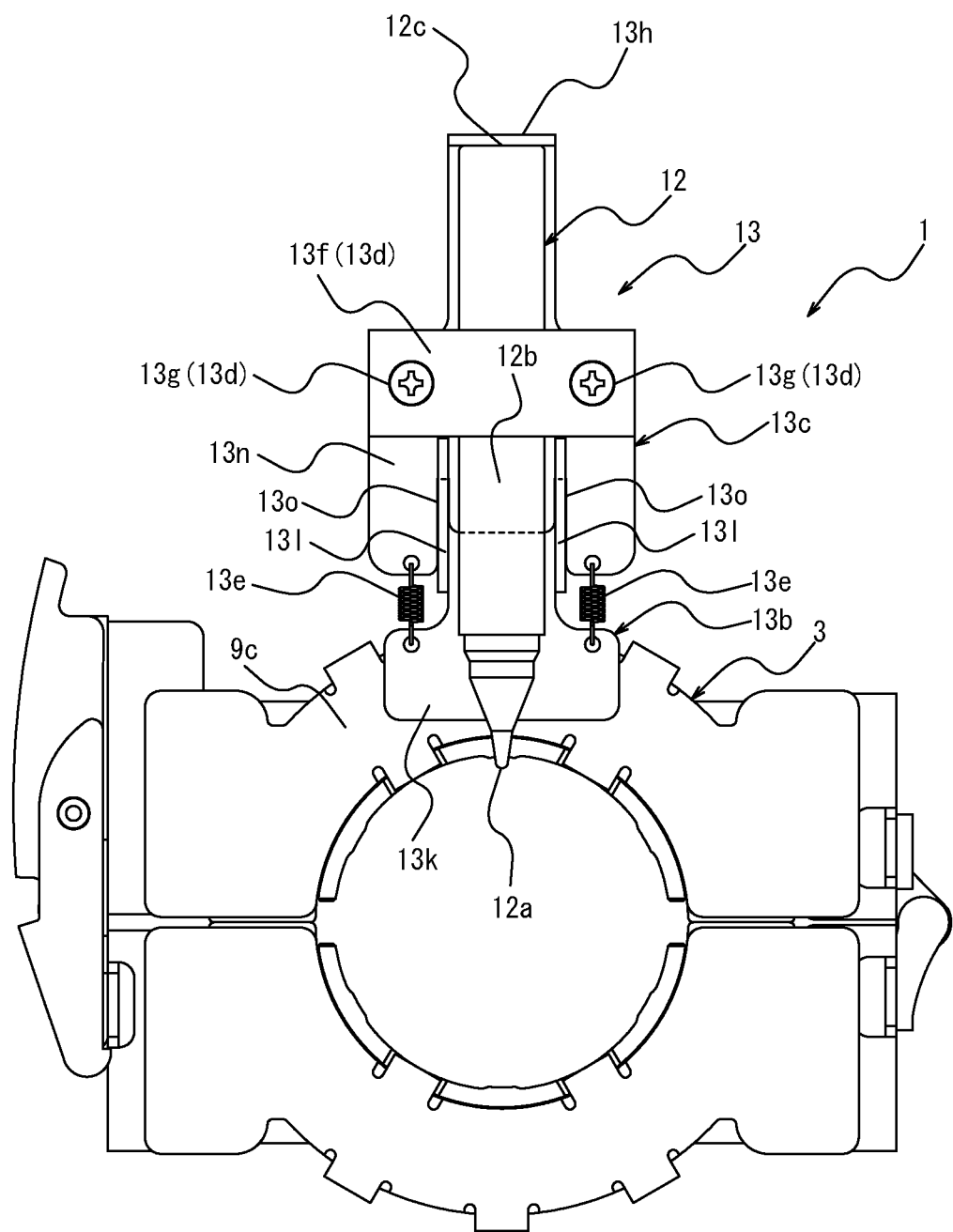
FIG. 14 is a side view of the magnetizing apparatus illustrated in FIG. 11, viewed in the axial direction.
Figure 15:
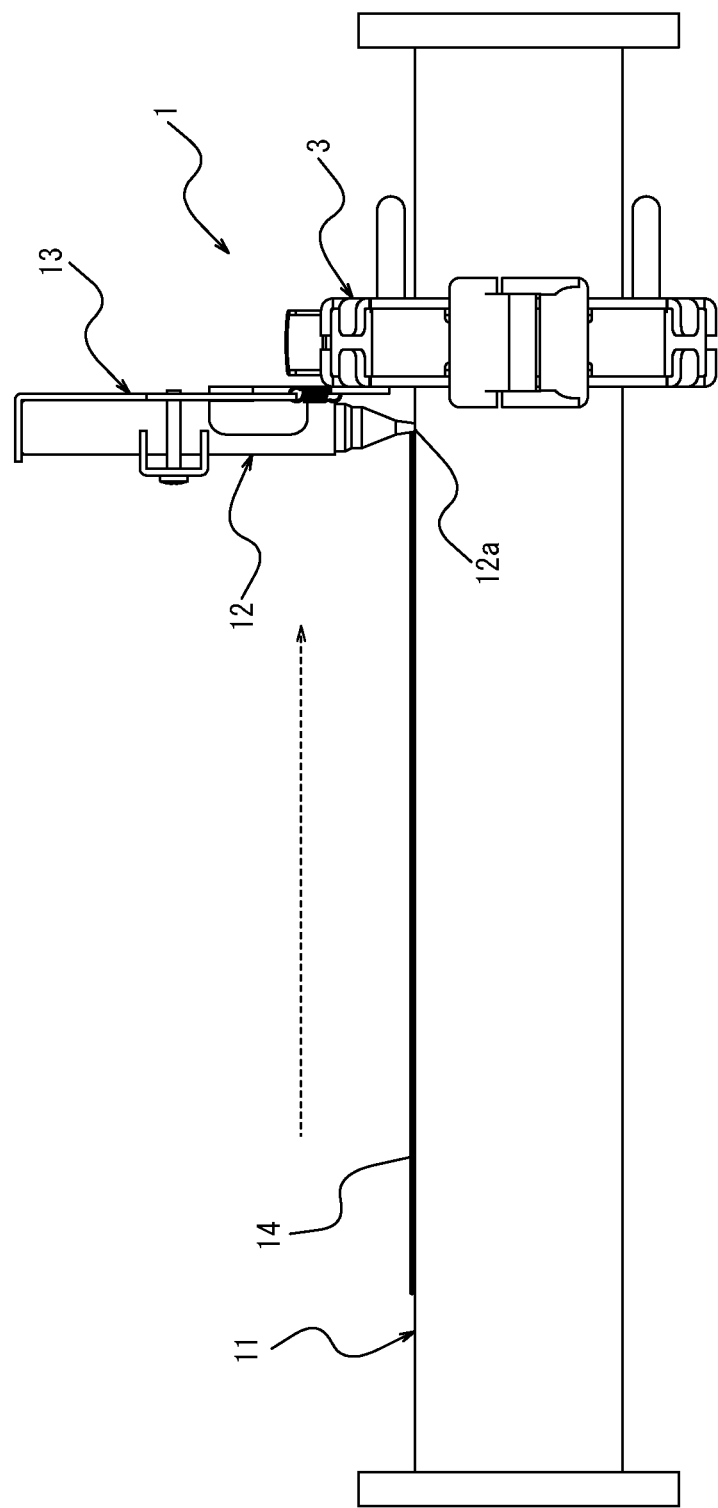
FIG. 15 illustrates a state in which the magnetizing apparatus illustrated in FIG. 11 is moved along a pipe.

The magnetizing apparatus 1 according to the present embodiment, illustrated in FIGS. 11, 13, and 14, includes a marker holder 13 that detachably holds a marker 12. The marker holder 13 forces the marker 12 toward the radial inner side of the annular portion 3. In the present embodiment, the marker holder 13 holds the marker 12 movably in the radial direction toward the radial inner side of the annular portion 3.

Figure 12:
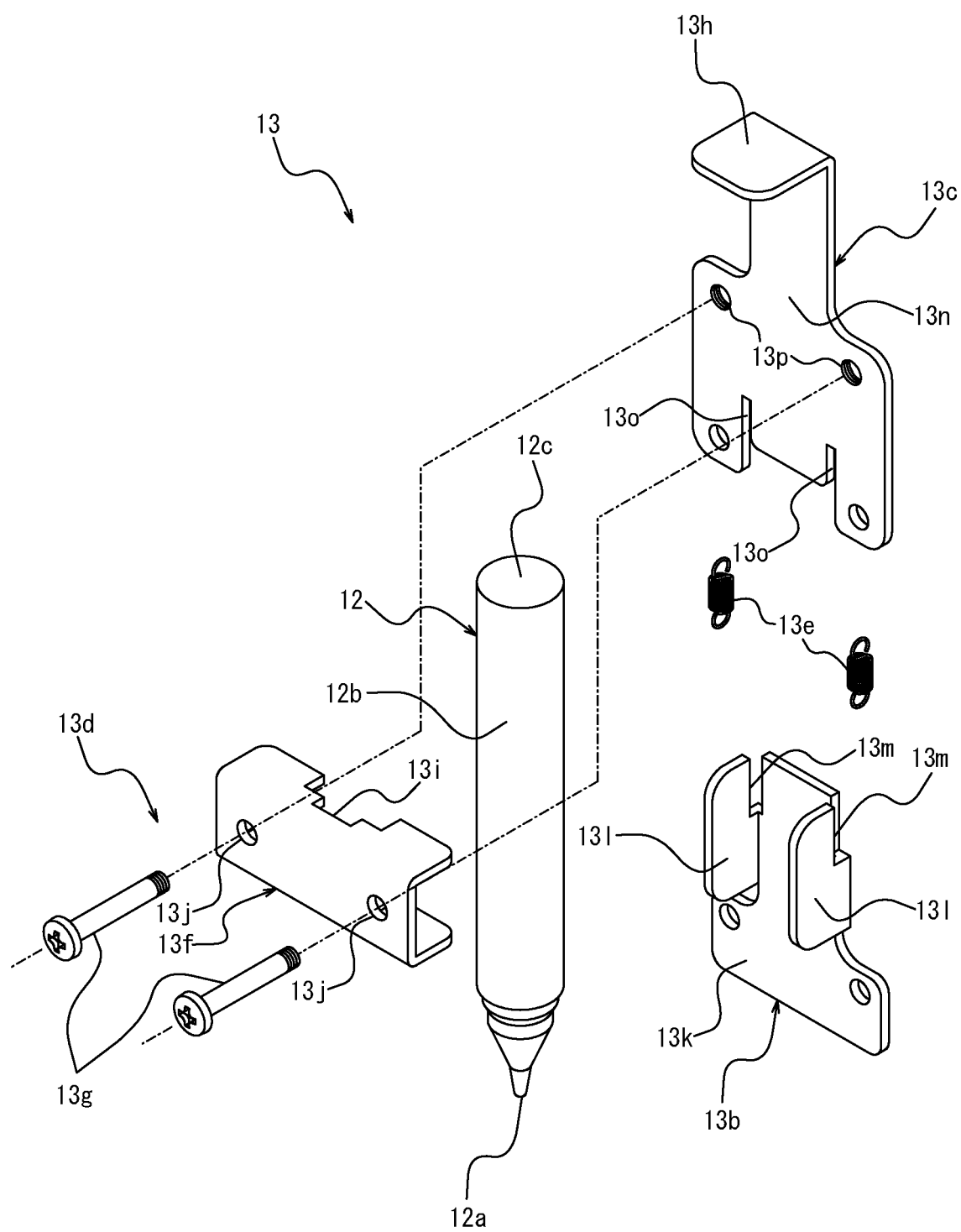
FIG. 12 is an exploded perspective view illustrating a marker holder and a marker illustrated in FIG. 11.

As illustrated in FIG. 12, the marker holder 13 includes a first holder member 13b, a second holder member 13c, a fixing member 13d, and two tension springs 13e. The fixing member 13d is configured by a pressing member 13f and two fastening members 13g. The marker 12 is a pen.

The first holder member 13b is supported by one axial end 9c of the cover member 9 of the annular portion 3. The second holder member 13c is fitted onto the first holder member 13b slidably along the radial direction. The first holder member 13b and the second holder member 13c are connected by two tension springs 13e. Therefore, the second holder member 13c is forced towards the radial inner side by these tension springs 13e. The tension springs 13e are arranged on either side of the annular portion 3 in the peripheral direction with respect to the marker 12. The second holder member 13c includes a pressure portion 13h that pushes a back end 12c of a torso 12b of the marker 12 (the opposite end from the pen tip 12a) toward the radial inner direction of the annular portion 3.

The marker 12 is fixed to the second holder member 13c by the fixing member 13d. The pressing member 13f of the fixing member 13d includes a recess 13i, into which the torso 12b of the marker 12 is inserted, and insertion holes 13j located on either side of the recess 13i in the peripheral direction of the annular portion 3. A fastening member 13g is passed in the axial direction through each of the insertion holes 13j, and by the fastening members 13g being fastened to the second holder member 13c, the torso 12b of the marker 12 is clamped in the axial direction of the annular portion 3 by the pressing member 13f and the second holder member 13c.

The first holder member 13b includes a base 13k, which is a flat plate perpendicular to the axial direction and supported by one axial end 9c of the cover member 9, and two side plates 13l that are located on either side of the torso 12b of the marker 12 in the peripheral direction of the annular portion 3 and are perpendicular to the base 13k. Between each of the side plates 13l and the base 13k, a slit 13m extending along the radial direction and opening to the radial outer side is formed.

The second holder member 13c includes a moveable plate 13n, which is a flat plate parallel to the base 13k of the first holder member 13b, and the pressure portion 13h, which is a flat plate perpendicular to the moveable plate 13n. The moveable plate 13n includes slits 13o that respectively engage the slits 13m of the first holder member 13b. Each slit 13o extends along the radial direction and opens toward the radial inner side. By the meshing of the slits 13m and the slits 13o, the second holder member 13c can slide along the radial direction against the first holder member 13b. The moveable plate 13n includes fastening holes 13p into which the respective fastening members 13g are fastened.

The two tension springs 13e connect the base 13k of the first holder member 13b and the moveable plate 13n of the second holder member 13c at either side, in the peripheral direction of the annular portion 3, of the two slits 13m and the two slits 13o.

In this way, the marker holder 13 of the present embodiment includes the first holder member 13b supported by the annular portion 3, the second holder member 13c held by the first holder member 13b slidably along the radial direction of the annular portion 3, the fixing member 13d that fixes the marker 12 to the second holder 13c, and the two tension springs 13e as a forcing member that forces the second holder member 13c towards the radial inner side of the annular portion 3.

According to the magnetizing apparatus 1 of the present embodiment, the pipe 11 can be magnetized by the same method as in the second embodiment. Also, according to the magnetizing apparatus 1 of the present embodiment, by performance of the moving step, a marking 14 can be applied to the pipe 11 by the marker 12 held in the marker holder 13. In other words, as illustrated by the arrow in FIG. 15, by the magnetizing apparatus 1 being moved along the pipe 11, the marker 12 can be moved along the pipe 11 together with the annular portion 3 while the pen tip 12a of the marker 12 is pressed against the outer peripheral surface of the pipe 11 by the marker holder 13. As a result, a marking 14 corresponding to the magnetized area of the pipe 11 in the axial direction is applied, as in the second embodiment. Therefore, the magnetized portion of the pipe 11 can be easily identified during application of detection means using a magnetic flaw detection method.

The marker holder 13 of the present embodiment can be modified in various ways. In other words, the marker holder 13 of the present embodiment may be configured to hold the marker 12 movably in the radial direction toward the radial inner side of the annular portion 3. In a case in which the marker holder 13 of the present embodiment includes the first holder member 13b, the second holder member 13c, the fixing member 13d, and the forcing member (for example, the tension springs 13e), it suffices for the marker holder 13 to include the first holder member 13b supported by the annular portion 3, the second holder member 13c held by the first holder member 13b slidably along the radial direction of the annular portion 3, the fixing member 13d that fixes the marker 12 to the second holder 13c, and a forcing member that forces the second holder member 13c towards the radial inner side of the annular portion 3.

Each of the above embodiments is only one example of the present disclosure, and various changes may be made, such as those described below.

It suffices for the magnetizing apparatus 1 to include the circular or non-circular openable and closeable annular portion 3 formed by the magnet 2, and for the annular portion 3 to include the lock mechanism 4 configured to hold the annular portion 3 in a closed state.

Each portion 2a of the magnet 2 is not limited to a semi-cylindrical shape. The magnet 2 is not limited to being formed by two portions 2a and may, for example, be formed by three or more portions. The magnet 2 is not limited to extending over the entire periphery in the peripheral direction of the annular portion 3 when the annular portion 3 is closed. The magnet 2 is not limited to having different polarities in the axial direction of the annular portion 3 and may, for example, have different polarities in the radial direction of the annular portion 3. The magnet 2 is not limited to being a permanent magnet and may be an electromagnet.

The annular portion 3 is not limited to being formed by the connecting member 5. The connecting member 5 is not limited to covering each portion 2a of the magnet 2. In a case in which the magnet 2 is formed by three or more portions 2a, the connecting member 5 may include two or more hinges 6 to rotatably connect the portions 2a of the magnet 2 that are adjacent to each other in the peripheral direction of the annular portion 3. The hinge 6 is not limited to a torque hinge. The hinge 6 is not limited to a single-axis hinge. The hinge 6 is not limited to being provided at the radial outer end of the annular portion 3. The annular portion 3 is not limited to including the hinge 6. For example, the annular portion 3 may be formed from a deformable, soft material magnet 2.

The connecting member 5 is not limited to including the sliding plate 7. Each portion 7a of the sliding plate 7 is not limited to a semi-cylindrical shape. The sliding plate 7 is not limited to being formed by two portions 2a and may, for example, be formed by three or more portions 7a to match the number of portions 2a of the magnet 2. Each portion 7a of the sliding plate 7 is not limited to being formed of a synthetic resin material.

The connecting member 5 is not limited to including the handles 8. The handles 8 are not limited to being provided respectively at two locations on either side of the hinge 6 in the peripheral direction of the annular portion 3. The two handles 8 are both not limited to being provided at one axial end 3a of the annular portion 3. The handles 8 are not limited to being formed by the pair of ends 8a and the intermediate portion 8b.

The connecting member 5 is not limited to including the cover member 9. The cover member 9 is not limited to being formed by two portions 9a and may, for example, be formed by three or more portions 9a to match the number of portions 2a of the magnet 2. Each portion 9a of the cover member 9 is not limited to including the radial outer end 9b facing the outer peripheral surface of the magnet 2, one axial end 9c facing one axial end face 2c of the magnet 2, and another axial end 9c facing the other axial end face 2c of the magnet 2. Each portion 9a of the cover member 9 is not limited to being formed by a plurality of members. The plurality of members configuring the portions 9a of the cover member 9 are not limited to being formed of a metallic material. The portions 9a of the cover member 9 are not limited to fixing the portions 7a of the sliding plate 7 by swaging.

The lock mechanism 4 is not limited to being configured by the toggle latch 10. For example, the lock mechanism 4 may be configured by fastening means such as a screw that detachably connects the peripheral ends of the annular portion 3. The toggle latch 10 is not limited to being provided at the peripheral ends of the annular portion 3.

The object to be magnetized by the magnetizing apparatus 1 is not limited to the pipe 11. The object may, for example, be a column, beam, or the like in a plant, bridge, or other structure. The object may, for example, be structural material such as H-shaped steel or I-shaped steel. The pipe 11 is not limited to having a circular cross-sectional shape. The pipe 11 is not limited to extension in a straight line in the axial direction. For example, the pipe 11 may include a corner that bends to form an angle such as a right angle.

The magnetizing apparatus 1 is not limited to being configured for detachment after magnetization of the object to enable application of detection means using a magnetic flaw detection method. For example, the magnetizing apparatus 1 may be configured so that detection means using a magnetic flaw detection method can be applied while the magnetizing apparatus 1 is still attached to the object. For example, the magnetizing apparatus 1 may be used to demagnetize a magnetized object.

The marker holder 13 is not limited to being attachable to and detachable from the marker 12. The marker holder 13 is not limited to forcing the marker 12 toward the radial inner side of the annular portion 3. The marker holder 13 is not limited to being axially supported by one axial end 9c of the cover member 9. The marker 12 is not limited to being a pen. The magnetizing apparatus 1 may include a plurality of marker holders 13 aligned in the peripheral direction of the annular portion 3. A plurality of abnormality detection apparatuses 15 may be installed in correspondence with a plurality of markings 14 applied using the plurality of marker holders 13.

REFERENCE SIGNS LIST

1 Magnetizing apparatus
2 Magnet
2a Portion
2b Peripheral end face
2c Axial end face
3 Annular portion
3a Axial end
4 Lock mechanism
5 Connecting member
6 Hinge
6a End
7 Sliding plate
7a Portion
8 Handle
8a End
8b Intermediate portion
9 Cover member
9a Portion
9b Radial outer end
9c Axial end
10 Toggle latch
10a Engagement portion
10b Toggle latch body
10c Engaged portion
10d Operation lever
10e Engaged member
10f Engagement member
11 Pipe
11a Flange
12 Marker
12a Pen tip
12b Torso
12c Back end
13 Marker holder
13a Inner peripheral surface
13b First holder member
13c Second holder member
13d Fixing member 13e Tension spring (forcing member)
13f Pressing member
13g Fastening member
13h Pressure portion
13i Recess
13j Insertion hole
13k Base
13l Side plate
13m Slit
13n Moveable plate
13o Slit
13p Fastening hole
14 Marking
15 Anomaly detection apparatus
O Central axis
P Rotation axis
Q1 First rotation axis
Q2 Second rotation axis
R Rotation axis
S Axis

The invention claimed is:

1. A magnetizing apparatus comprising:
a circular or non-circular openable and closeable annular portion formed by a magnet; and
a marker holder configured to hold a marker for marking an object placed inside the annular portion by opening and closing the annular portion,
wherein the annular portion comprises a lock mechanism configured to hold the annular portion in a closed state.

2. The magnetizing apparatus according to claim 1, wherein the magnet has different polarities in an axial direction of the annular portion.

3. The magnetizing apparatus according to claim 1, wherein the magnet comprises a plurality of portions interconnected in a peripheral direction of the annular portion.

4. The magnetizing apparatus according to claim 3, wherein the annular portion comprises a hinge rotatably connecting portions of the magnet, among the plurality of portions, that are adjacent in the peripheral direction of the annular portion.

5. The magnetizing apparatus according to claim 4, wherein the hinge is a torque hinge with a predetermined rotational resistance.

6. The magnetizing apparatus according to claim 1, wherein the lock mechanism is configured by a toggle latch provided at both peripheral ends of the annular portion.

7. The magnetizing apparatus according to claim 1, wherein the annular portion comprises a sliding plate that forms an inner peripheral surface of the annular portion.

8. A magnetizing method for magnetizing an object using the magnetizing apparatus according to claim 1, the magnetizing method comprising:
an attaching step of attaching the magnetizing apparatus to the object by opening and closing the annular portion to place the object inside the annular portion and holding the annular portion in a closed state with the lock mechanism;
a moving step of moving the magnetizing apparatus relative to the object in an axial direction of the annular portion while the magnetizing apparatus is attached to the object; and
a detaching step, after the moving step, of releasing the lock mechanism to detach the magnetizing apparatus from the object.

9. The magnetizing method according to claim 8, wherein the magnetizing method further comprises a marking step of applying a marking to the object, by performing the moving step, with the marker held by the marker holder.

10. The magnetizing apparatus according to claim 1, wherein the marker holder is configured to force the marker toward the object placed inside the annular portion.

11. The magnetizing apparatus according to claim 1, wherein the marker holder is configured to force the marker toward a radical inner side of the annular portion.

* * * * *